(12) United States Patent
Thompson

(10) Patent No.: US 9,695,848 B2
(45) Date of Patent: Jul. 4, 2017

(54) PINCH WELD CLAMP

(71) Applicant: Owens Products, Inc., Sturgis, MI (US)

(72) Inventor: Michael Ray Thompson, Sturgis, MI (US)

(73) Assignee: Owens Products, Inc., Sturgis, MI (US)

( * ) Notice: Subject to any disclaimer, the term of this patent is extended or adjusted under 35 U.S.C. 154(b) by 78 days.

(21) Appl. No.: 14/625,913

(22) Filed: Feb. 19, 2015

(65) Prior Publication Data

US 2016/0245316 A1    Aug. 25, 2016

(51) Int. Cl.
*F16B 2/00*    (2006.01)
*F16B 2/06*    (2006.01)

(52) U.S. Cl.
CPC .............. *F16B 2/065* (2013.01); *F16B 2/00* (2013.01)

(58) Field of Classification Search
CPC ................................. F16B 2/065; B60R 13/00
See application file for complete search history.

(56) References Cited

U.S. PATENT DOCUMENTS

| | | |
|---|---|---|
| 1,701,581 A | 10/1927 | McWhinnie |
| 3,447,727 A | 6/1969 | Lowe |
| 3,601,295 A | 8/1971 | Lowe |
| 3,887,217 A | 6/1975 | Thomas |
| 4,017,093 A | 4/1977 | Stecker, Sr. |
| 4,238,951 A * | 12/1980 | Grainger .................. B21D 1/14 269/114 |
| 4,655,072 A | 4/1987 | Miyoshi |
| 4,982,974 A | 1/1991 | Guidry |
| 5,483,772 A * | 1/1996 | Haddock ................. E04D 13/10 248/512 |
| 5,601,300 A | 2/1997 | Fink |
| 6,077,576 A | 6/2000 | Osborn |
| 6,568,238 B2 | 5/2003 | Tyler |
| 7,513,080 B1 * | 4/2009 | Showalter ............... E04D 13/10 403/373 |
| 8,272,172 B2 * | 9/2012 | Li .......................... F24J 2/5205 248/237 |
| 2002/0088196 A1 * | 7/2002 | Haddock ............... E04D 3/3608 52/543 |

* cited by examiner

*Primary Examiner* — John Walters
*Assistant Examiner* — James Triggs
(74) *Attorney, Agent, or Firm* — Varnum, Riddering, Schmidt & Howlett LLP

(57) ABSTRACT

A pinch weld clamp includes a clamp body and a channel formed in the body. The channel is configured to engage a flange or pinch weld on a vehicle. One or more set screws extend from an outer wall of the clamp body into the channel to clamp onto the pinch weld. A connecting screw is connected to the clamp body to attach a device, such as a running board, to the vehicle.

14 Claims, 6 Drawing Sheets

PINCH WELD CLAMP

FIELD OF INVENTION

The present invention generally relates to an apparatus and method for connecting an accessory piece to a vehicle, and specifically for connecting a running board or the like to the pinch weld of a vehicle.

BACKGROUND

The use of running boards on vehicles such as vans, pickup trucks, and four wheel drive vehicles is a well-established practice. Running boards make it easier for vehicle passengers and drivers to enter and exit some vehicles, especially those with high clearance, as well as making roof access easier. Running boards can help protect the sides of the vehicle from road debris, and they are also used by some to enhance the aesthetic appearance of the vehicle's exterior.

Commonly, running boards are connected to a vehicle by attaching a connecting piece to the side or underside of the vehicle. For example, the running boards may include a connecting piece, such as a bracket, connecting rod, or the like, that is attached to the running board. The connecting piece may then be connected to the side or underside of the vehicle to position the running board in the desired proximity to the vehicle.

In addition to running boards, other vehicle accessories are sometimes connected to the vehicle body or underside. For example, running lights or the like may be connected in a similar manner as running boards to the vehicle.

Traditionally, running boards are fixed to the frame of a vehicle in one of two manners. First, the running boards may be welded directly to the frame or body of the vehicle. The drawback to this method of attachment, however, is that the welding is permanent and requires skilled labor. Therefore, the running boards are not easily attachable or removable.

The second manner is to bolt the running boards to the body or frame of the vehicle. Typically, this involves drilling into the frame or pinch weld of the vehicle to attach the running boards. However, this attachment method also has drawbacks. Specifically, drilling or boring into the frame or body can weaken the frame and allow for rust and other corrosion to set in.

Ideally, the running boards or other vehicle accessories could be mounted to the vehicle in a safe and reliable fashion without permanently fixing them to the vehicle or damaging the vehicle body or frame.

Accordingly, an improved attachment for connecting running boards and other vehicle accessories to a vehicle is needed in the art.

SUMMARY

A pinch weld clamp is generally presented. The pinch weld clamp includes a clamp body. The clamp body may be a unitary piece. The clamp body includes a channel that bisects the body. The channel is configured to engage a flange on a vehicle. The flange may be a pinch weld or any applicable flange. One or more set screws extend from an outer wall of the clamp body into the channel. The set screws engage the flange to connect the clamp body thereto.

A connecting screw is connected to the clamp body. The connecting screw may be used to connect a device for use with the vehicle. In an embodiment a running board is connected to the clamp body.

In an embodiment, a pinch weld clamp assembly may include two or more pinch weld clamps connected to a pinch weld or flange of a vehicle. The pinch weld clamps may be spaced along the pinch weld. A running board may be connected to each pinch weld clamp. The running boards may be connected to the clamps by an adjustable bracket.

BRIEF DESCRIPTION OF THE DRAWINGS

The operation of the invention may be better understood by reference to the detailed description taken in connection with the following illustrations, wherein.

DETAILED DESCRIPTION

Figure 1:
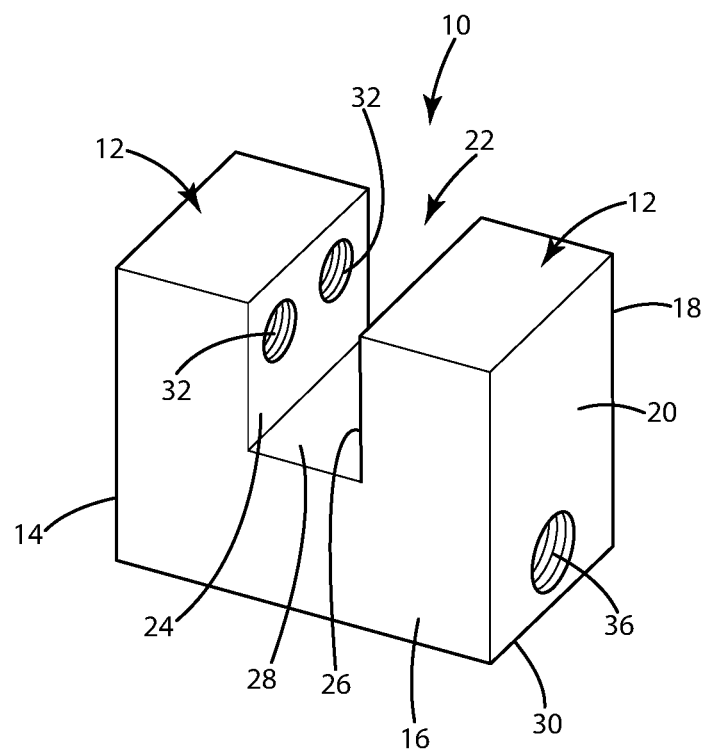
FIG. 1 illustrates a perspective view of a pinch weld clamp.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A pinch weld clamp 10 is generally presented. The pinch weld clamp 10 may be a clamping device, as generally described herein. The pinch weld clamp 10 is specifically designed to clamp to a desired portion of a vehicle and to interconnect a device, such as a running board, to the vehicle.

The pinch weld clamp 10 may be specifically designed to clamp to a flange or a pinch weld of a vehicle. The pinch weld is formed on the underside of the vehicle where two pieces of metal are welded together to form the lower chassis. The pinch weld commonly protrudes down from the chassis and extends from behind the front wheel well to before the rear wheel well, directly underneath the doors. The weld forms a ridge or flange that is commonly used for aligning a jack underneath the vehicle.

A pinch weld clamp 10 is shown in FIGS. 1-6. The pinch weld clamp 10 may comprise a clamp body that is a single unitary piece formed of any appropriate material, such as any metals, plastics, polymers, or the like. The pinch weld clamp 10 may be shaped and sized to engage and clamp to a flange, such as the pinch weld of a vehicle, and to connect a device, such as a running board, thereto.

The pinch weld clamp 10 is generally hyper-rectangular (a three-dimensional rectangle), having a rectangular profile. The pinch weld clamp 10 may include a top surface 12, front surface 14, side surfaces 16 and 18, and back surface 20. Each surface may be generally flat.

The pinch weld clamp 10 may include a channel 22. The channel 22 may be any appropriate size and shape and may be configured to engage a flange, such as the pinch weld, as described further below. The channel 22 may be formed into the top of the pinch weld clamp 10 such that it bisects the top surface 12 from one side surface 16 to the other side surface 18. The top surface 12 may comprise two separate surfaces positioned on either side of the channel 22. The channel 22 may include interior surfaces at its boundaries, including a first inner wall 24, a second inner wall 26, and a bottom wall 28.

The channel 22 may be formed by any appropriate means. For example, the pinch weld clamp 10 may be molded or cast such that the channel 22 is formed into the pinch weld clamp body 10. Alternatively, the channel 22 may be milled, cut, or otherwise shaped into the pinch weld clamp 10.

The channel 22 may extend approximately half way into the pinch weld clamp 10 from the top surface 12. For example, the pinch weld clamp may be approximately 1 inch in height from its base 30 to the top surface 12. The channel 22 may extend approximately ½ inch into the pinch weld clamp 10 from the top surface. It will be appreciated, however, that the channel 22 depth may vary depending on the specific application or flange dimensions.

The channel 22 width may be sized to specifically engage the pinch weld of a vehicle. For example, the channel 22 may be approximately 0.375 inches wide. It will be appreciated, however, that the channel 22 width may vary depending on the specific application or flange dimensions.

Figure 2:
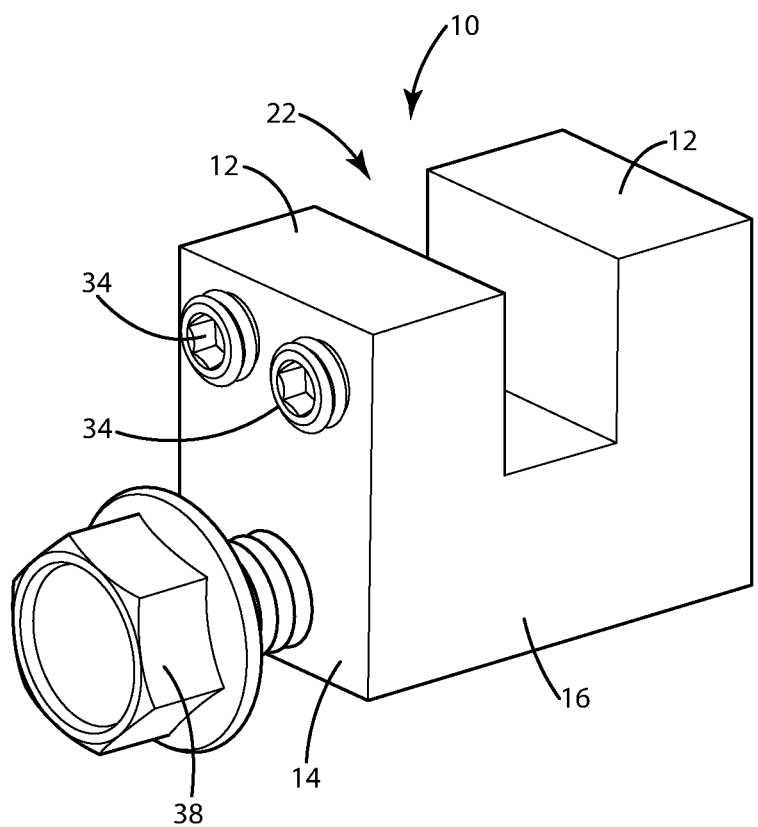
FIG. 2 illustrates a perspective view of a pinch weld clamp having an connecting screw and two set screws.
Figure 3:
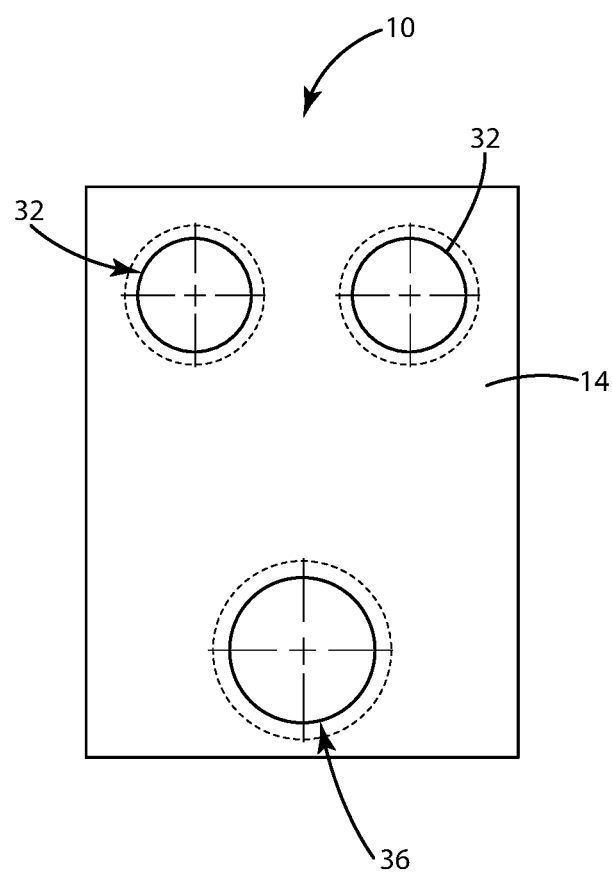
FIG. 3 illustrates a transparent front view of a pinch weld clamp.
Figure 4:
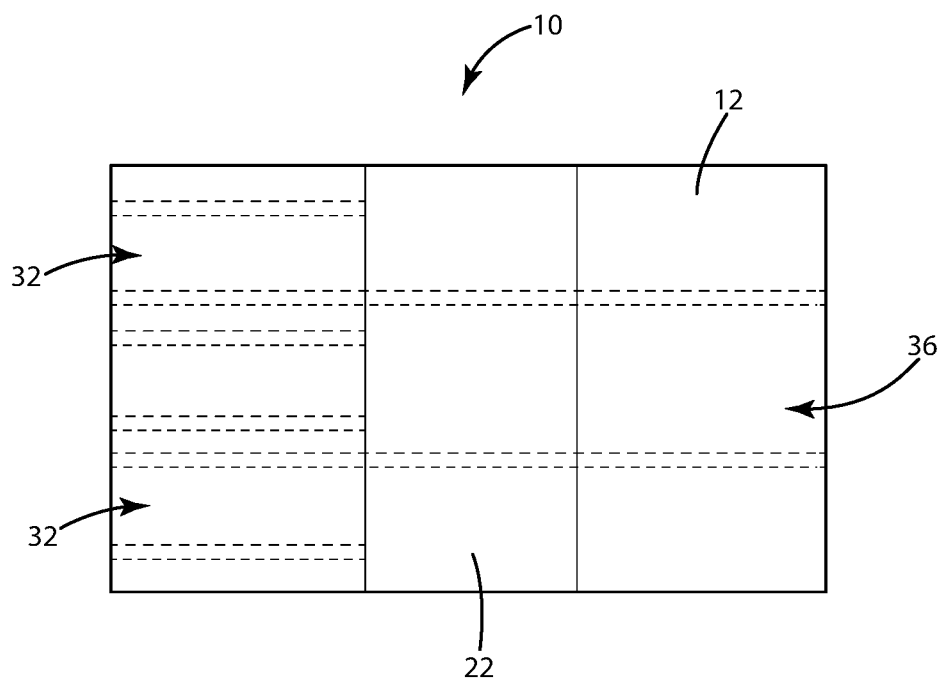
FIG. 4 illustrates a top view of a pinch weld clamp.

The pinch weld clamp 10 may include one or more set screw holes 32. As illustrated in FIGS. 1-6, the pinch weld clamp 10 may include two set screw holes 32, however, it will be appreciated that the pinch weld clamp 10 may include any appropriate number of set screw holes 32. The set screw holes 32 may be formed in the top portion of the pinch weld clamp 10 to create openings from the front surface 14 to the channel 22. As best seen in FIG. 3, the two set screw holes 32 may be symmetrically aligned on either side of the vertical centerline of the front surface 14. The set screw holes 32 may be threaded and configured to receive a screw or other threaded fastener therein.

The set screw holes 32 may be configured to each receive a set screw 34 therein. The set screws 34 may be accessed and tightened from the front surface 14, as shown in FIG. 2. The set screws 34 may extend through the clamp 10 into the channel 22. In an embodiment, the set screw 34 may have a pointed tip, such as cone point set screws, to engage and clamp to the pinch weld or flange of the vehicle.

Figure 5:
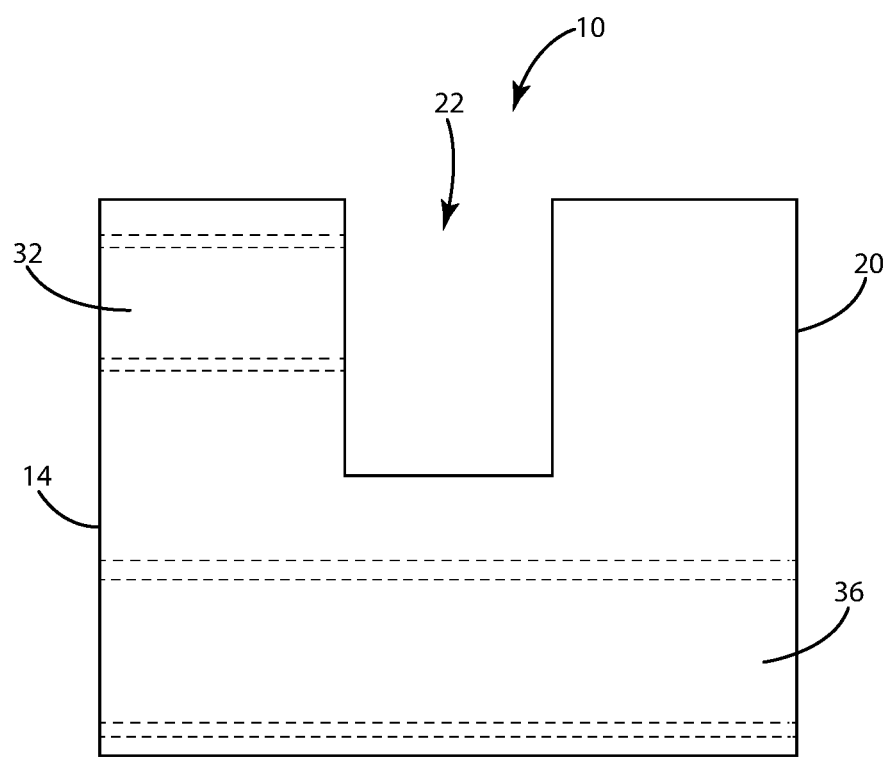
FIG. 5 illustrates a side view of a pinch weld clamp.

The pinch weld clamp may include one or more connecting screw holes 36. As illustrated in FIGS. 1-6, the pinch weld clamp 10 may include a single connecting screw hole 36, however, it will be appreciated that the pinch weld clamp 10 may include any appropriate number of connecting screw holes 36. As best seen in FIGS. 3 and 5, the pinch weld clamp 10 may include a single connecting screw hole 36 positioned near the base 30 of the clamp and aligned with a vertical centerline of the front surface 14 and back surface 20. The connecting screw hole 36 may be threaded and configured to receive a screw or other threaded fastener therein. The connecting screw hole 36 may extend through the entire length of the pinch weld clamp 10, as shown in FIG. 5, or may extend through only a portion of the clamp 10.

The connecting screw hole 36 may be configured to each receive a connecting screw 38 therein. The connecting screw 38 may be accessed and tightened from the front surface 14, as shown in FIG. 2. The connecting screw 38 may extend into a portion of the pinch weld clamp 10 or entirely through the pinch weld clamp 10.

The connecting screw 38 may fasten a device to the pinch weld clamp 10. In an embodiment illustrated in FIG. 6, the connecting screw may connect one or more running boards to the pinch weld clamp 10. For example, a mounting bracket 40 may be connected to the pinch weld clamp 10 by the connecting screw 38. The mounting bracket 40 may include an opening 42 configured to receive the connecting screw 38 therethrough. The opening 42 may extend along the length of the mounting bracket 40 to allow the mounting bracket 40 to slide with respect to the connecting screw 38.

Figure 6:
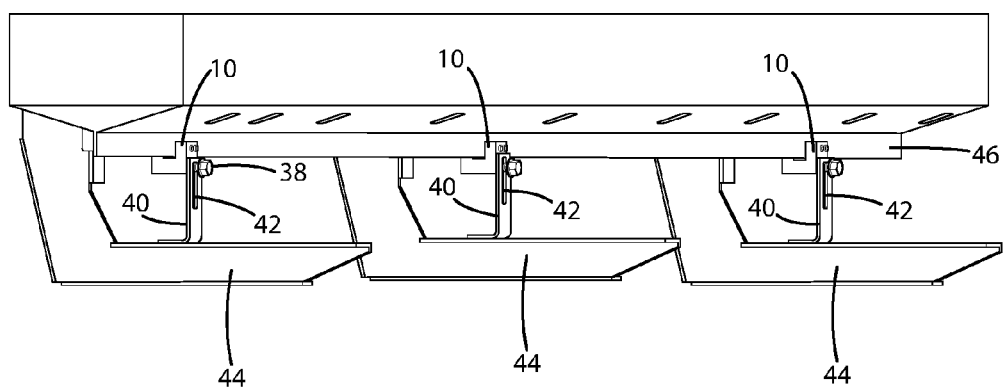
FIG. 6 illustrates a plurality of pinch weld clamps connecting running boards to a pinch weld of a vehicle.

The mounting bracket 40 may be fixed to a device, such as a running board 44. As shown in FIG. 6, the mounting bracket 40 may be connected at one end to the pinch weld clamp 10 and at the other end to a running board 44. The running board 44 may be welded, fastened, or otherwise connected to the bracket 40 in any appropriate manner.

In an embodiment, a vehicle may include a plurality of pinch weld clamps 10 positioned along the pinch weld 46 or similar flange underneath the vehicle. Each pinch weld clamp 10 may be appropriately spaced and clamped along the pinch weld 46, as illustrated in FIG. 6. The mounting bracket 40 may be adjusted along the opening 42 to align a plurality of running boards 44 connected to the pinch weld clamps 10. Each running board 44 may extend beyond vehicle body to provide a surface for a passenger to step on and support themselves when entering the vehicle.

In use, a pinch weld clamp 10 may be aligned with the pinch weld 46 or other flange of a vehicle. The set screw holes 32 may be aligned with a side of the pinch weld 46 and the set screws 34 may be tightened. In an embodiment, the set screws 34 may be tightened at 10 foot pound of torque. A connecting screw 38 may be inserted into the connecting screw hole 36 through an opening 42 in a mounting bracket 40 to connect the mounting bracket 42 to the pinch weld clamp 10. The mounting bracket 40 may be connected at one end to a device, such as a running board 44. The height of the running board 44 may be adjusted by sliding the mounting bracket 40 with respect to the connecting screw 36 within the opening 42 until the desired height is obtained.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. A clamp comprising:
a clamp body;
a channel bisecting a portion of the clamp body;
a first set screw extending from an outer wall of the clamp body into the channel;
a connecting screw extending into the clamp body;
a running board connected to the clamp body, wherein the running board includes a bracket connected to the clamp body by the connecting screw; and
wherein the channel is configured to engage a flange on a vehicle and clamp the first set screw to the flange.

2. The clamp of claim 1, wherein the flange on a vehicle is a pinch weld.

3. The clamp of claim 1 wherein the bracket includes an opening for adjusting the height of the running board with respect to the vehicle.

4. The clamp of claim 1, further comprising a second set screw extending from an outer wall of the clamp body to the channel.

5. The clamp of claim 1, wherein the first set screw is a cone point set screw.

6. The clamp of claim 1, wherein the clamp body has a height from the base of the clamp to the top of the clamp, and wherein the channel extends half of the length into the clamp body.

7. The clamp of claim 1, wherein the clamp body is a unitary piece.

8. A pinch weld clamp assembly comprising:
   a clamp body;
   a channel bisecting a portion of the clamp body;
   a first set screw extending from an outer wall of the clamp body into the channel;
   a connecting screw connected to the clamp body, wherein the connecting screw connects a first running board to the clamp body;
   wherein the channel is configured to engage a pinch weld on a vehicle and clamp the first set screw to the flange; and
   wherein the first running board is connected to the clamp body by an adjustable bracket.

9. The pinch weld clamp assembly of claim 8, further comprising a second set screw extending from an outer wall of the clamp body into the channel.

10. The pinch weld clamp assembly of claim 7, wherein the first and second set screws are tightened at 10 foot pound of torque.

11. The pinch weld clamp assembly of claim 8, wherein the clamp body is a unitary piece.

12. The pinch weld clamp assembly of claim 8 further comprising:
    a second clamp body having a channel bisecting a portion of the clamp body;
    a set screw extending from an outer wall of the second clamp body into the channel;
    a connecting screw connected to the second clamp body, wherein the connecting screw connects a second running board to the second clamp body; and
    wherein the channel is configured to engage the pinch weld on the vehicle.

13. The pinch weld clamp assembly of claim 12, wherein the first and second running boards are connected to the clamp body and second clamp body by a first and second bracket.

14. The pinch weld clamp assembly of claim 12, wherein the first running board is aligned to be even with the second running board.

* * * * *